United States Patent
Lerner (10) Patent No.: US 10,025,835 B2
(45) Date of Patent: Jul. 17, 2018

(54) SELECTING MATCHES IN A SOCIAL DATING SYSTEM

(71) Applicant: SNAP Interactive, Inc., New York, NY (US)

(72) Inventor: Clifford Lerner, New York, NY (US)

(73) Assignee: PeerStream, Inc., New York, NY (US)

( * ) Notice: Subject to any disclaimer, the term of this patent is extended or adjusted under 35 U.S.C. 154(b) by 211 days.

(21) Appl. No.: 14/639,981

(22) Filed: Mar. 5, 2015

(65) Prior Publication Data

US 2015/0254311 A1 Sep. 10, 2015

Related U.S. Application Data

(60) Provisional application No. 61/948,495, filed on Mar. 5, 2014.

(51) Int. Cl.
| | | |
|---|---|---|
| *G06F 17/00* | (2006.01) | |
| *G06F 17/30* | (2006.01) | |
| *G06Q 30/02* | (2012.01) | |
| *G06Q 50/00* | (2012.01) | |

(52) U.S. Cl.
CPC ... *G06F 17/30554* (2013.01); *G06Q 30/0269* (2013.01); *G06Q 50/01* (2013.01)

(58) Field of Classification Search
CPC ......... G06F 17/30554; G06F 17/30864; G06F 17/30867; G06F 17/3053
See application file for complete search history.

(56) References Cited

U.S. PATENT DOCUMENTS

2010/0145869 A1* 6/2010 Brown .................. G06Q 10/10
705/319
2013/0110731 A1* 5/2013 Wey ....................... G06Q 10/06
705/319

* cited by examiner

*Primary Examiner* — Truong Vo
(74) *Attorney, Agent, or Firm* — Fenwick & West LLP (57) ABSTRACT

A social dating system selects matching users for a viewing user based on common interests between the matching user and the viewing user. The social dating system accesses information related to users from a social networking system, indicating relationships between users and social networking objects. The social dating system determines common interests between users by determining a relatedness of social networking objects. The common interests are used to determine compatibility between users and to select matching users. Suggested messages are also selected for the viewing user to initiate a conversation based on common interests. The suggested messages may be based on promotions by an advertiser.

18 Claims, 6 Drawing Sheets

| Boating | | |
|---|---|---|
| Sailing | Fishing | Kayaking |
| Popular Boat Co. | Sal's Marina | Glass Bottom Boat Store |
| Paddle Boat | Fiberglass Paddles | Fiberglass Canoe |

SELECTING MATCHES IN A SOCIAL DATING SYSTEM

CROSS-REFERENCE TO RELATED APPLICATIONS

This application claims the benefit of provisional application No. 61/948,495, filed Mar. 5, 2014, the contents of which are incorporated by reference in its entirety.

BACKGROUND

The described embodiments relate generally to matchmaking, and specifically to matchmaking using computerized social networking information.

Dating systems connect users that may be interested in meeting one another. Adequately connecting users by the dating system is difficult, because users generally self-report information about themselves, and users are frequently reluctant to go on "blind" dates, or to interact with someone that the user doesn't know. Moreover, even when a user sees another user that they may find interesting, it is difficult to determine whether that user is still active because a person's profile is often static and doesn't indicate a user's activities. In addition, online conversations often become quickly stilted.

SUMMARY

A computerized dating system suggests matches using social networking information to identify common interests between matched users. The common interests between a viewing user and a matched user are determined using sparse social graph data. The social graph data describes a user's interactions with social networking objects in a social networking system. The social networking objects represent concepts such as things, activities, or locations. Examples of social networking objects include a musical band, a television show, a city, membership in a group, and so on. Such interactions include a user's explicit interest in the social networking object, such as a user "liking" an object, joining an event related to the object, or interacting with the object's webpage on the social networking system. These social networking objects are used to identify specific interests of a user represented by the social networking object. For example, a social networking object for a band represents a specific interest in that band. General interests for a user are identified from the specific interests identified from the social networking objects associated with a user. The general interests identify groupings of similar social networking objects to provide a more general concept for the similar social networking objects. For example, an interaction indicating that a user "likes" an object representing a local *marina* may be used to identify a general interest of "boating" for the user.

To identify other users that a viewing user may be interested in, the dating system identifies common interests between the viewing user and potential matches. The common interests may determined based on interaction by the users with the same social networking object (i.e., specific interests), or general interests identified for the users. Since the social networking data includes a vast number of social networking objects, the general interests permit users to view likely common interests with other users that may otherwise be missed.

To identify users that are likely to be compatible with a viewing user, the dating system identifies a preliminary set of matching users. The preliminary set of matching users may be based on criteria specified by the user requesting the search, such as an age range, geographic area, and various other parameters. The dating system determines common interests between the matching users and the requesting user and generates a compatibility score indicating the likely compatibility of each matching user with the viewing user. The dating system generates the match score based in part on the common interests between the viewing user and a potential match. In addition, in one embodiment the dating system determines a degree of separation between the viewing user and the potential match, incorporating the degree of separation into the compatibility score. The preliminary set of matching users may be ranked or ordered according to the resulting match score to generate a set of matching users to present to the viewing user. In one embodiment, the user may search for users that share a selected common interest with the viewing user.

After viewing potential matches, the viewing user may interact with the potential match. For example, the viewing user may apply or adjust a filter to modify the qualifications of the matches shown to the viewing user, such as specifying ages, interests, or other aspects of a match of interest to the viewing user. The viewing user may also interact with the match to view interests that the match and the viewing user have in common and to send a message relating to the common interest. In one embodiment, the dating system suggests a message relating to that interest, which may include a suggestion from a sponsor and attach a promotion from the sponsor. In this way, the viewing user may propose an activity along with a promotion from the sponsor, such as discounted tickets to an event that interests the viewing user and the match.

In one embodiment, the dating system accesses activities by the matching users (such as posts to a social networking system) that relate to the common interests. These activities related to common interest are parsed and presented to the user to generate a stream of activities by the matching users that may be of interest to the viewing user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
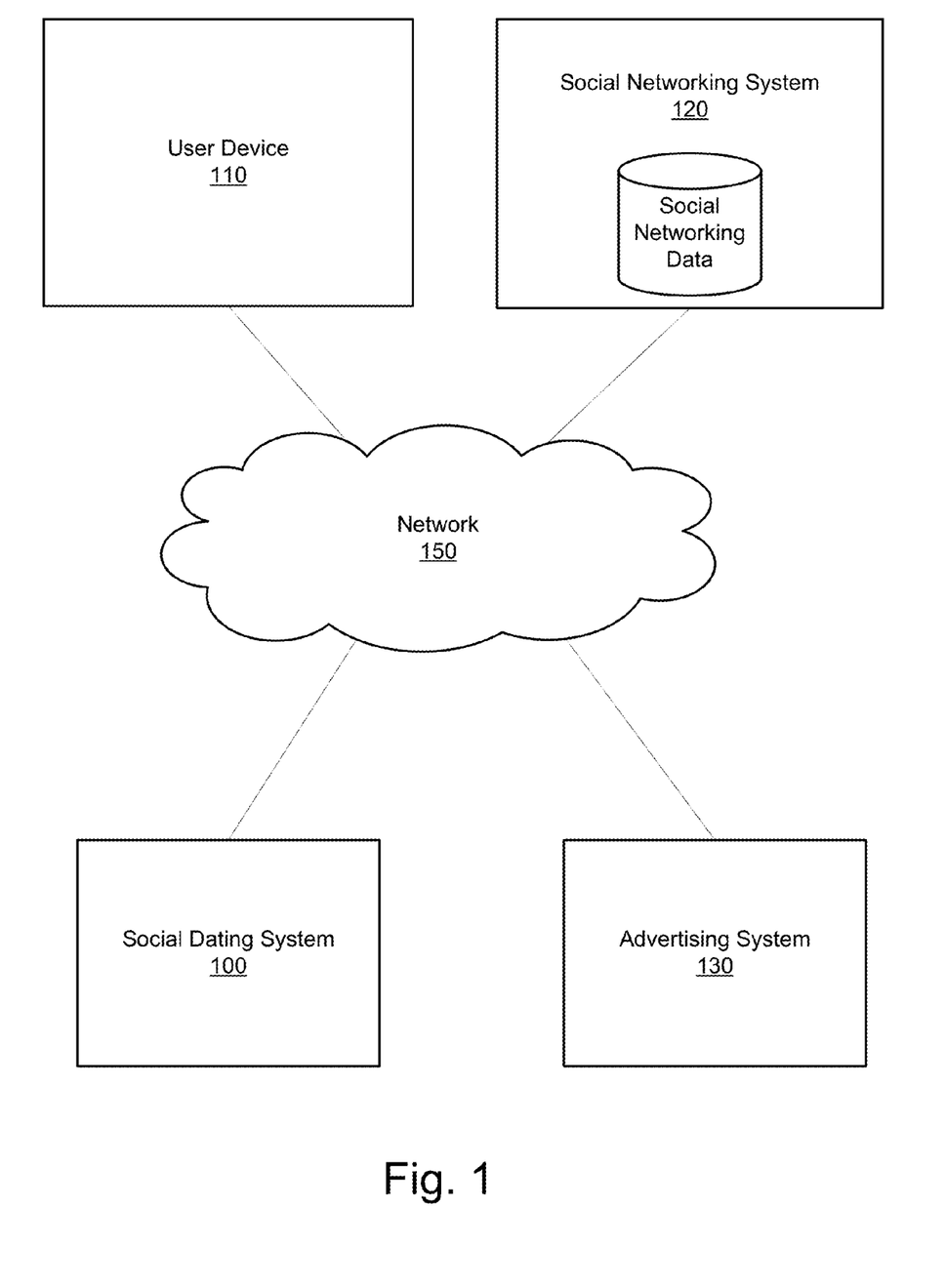
FIG. 1 is an environment for a social dating system according to an embodiment.

FIG. 1 is an environment for a social dating system 100 according to an embodiment. The social dating system 100 accesses social networking data at a social networking system 120 and reveals information about potential dates to users of the social dating system. The user of the social dating system 100 and the potential dates are members of the social networking system 120. For convenience, the user who is viewing potential dates on the social dating system is referred to here as the viewing user. The potential dates for the viewing user may be selected from users on the social networking system that are indirectly connected to the viewing user. An indirectly connected user is a connection in the social networking system that is not directly connected to the viewing user. That is, an indirectly connected user has at least two degrees of separation from the viewing user. A degree of separation is the number of links from the viewing user, as measured by connections between users of the social networking system. Colloquially, an indirectly connected user with a degree of separation of 2 is a "friend of a friend." The social dating system 100 may consider a user an indirectly connected user up to a maximum degree of separation, such as 2, 3, or 4. As the number of possible connections increases exponentially with each additional degree of separation, the number of indirectly connected users that are considered for a viewing user greatly expands. The social dating system 100 may also consider users of the social networking system that are directly connected (e.g., a degree of separation of 1) or who are not connected to the viewing user (or not connected within the maximum degree of separation).

The social dating system 100 is connected to a user device 110, social networking system 120, and advertising system 130 through a network 150. The social dating system 100 retrieves social networking data from a social networking system 120. The social networking system 120 enables users of the social networking system to establish relationships ("connections") between other users of the social networking system along with relationships with non-user entities. The non-user entities may be various interests, brands, companies, events, and other items. The social networking system 120 maintains social networking data that is organized as a social graph, with nodes as social networking objects representing entities in the graph and links between the social networking objects indicating relationships between the entities. The links may indicate interactions, relationships, posts, and other types of activities between two nodes. Users of the social networking system 120 also post pictures, make status updates, indicate attendance in events, and otherwise generate events in the social networking system 120 that may be associated with a social networking object. Though described herein as a social graph and with social networking objects, any suitable method of maintaining connection and interaction data by a social network may be used by the social dating system 100.

The social dating system 100 provides services to the viewing user through a user device 110. The user device 110 is any suitable computing device for communicating with the social dating system 100 and interacting with content provided by the social dating system 100. These computing devices include a desktop, laptop, tablet, and mobile devices, among other systems. The user device 110 may communicate with the social dating system 100 through a website or Internet browser, or the user device 110 may execute an application that communicates with the social dating system 100.

The advertising system 130 places promotions with social dating system 100. The advertising system 130 provides an advertising campaign, keywords, and targeting criteria to the social dating system 100. The advertising system 130 may also identify entities in the social networking system that are associated with the advertising system or that the campaigns provided by the advertising system 130 should be directed toward.

The social dating system 100 retrieves social networking data from the social networking system 120 and analyzes the social networking data to determine common interests between users. To determine common interests, the social dating system 100 determines similarity between interests of the viewing user and interests represented in the activities of other users. As described further below, the social dating system 100 incorporates common interest information in determining compatibility between users.

Figure 2:
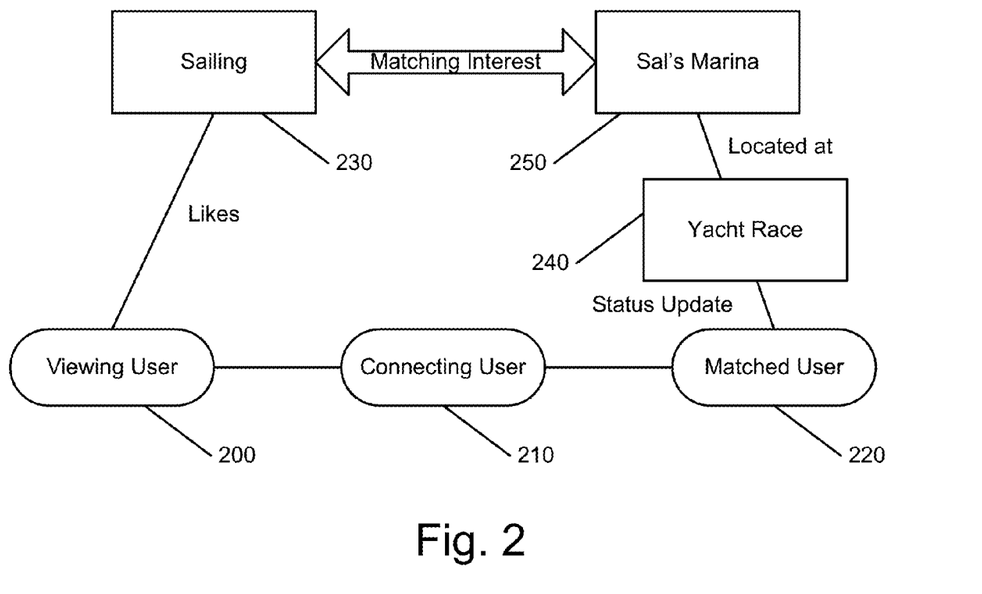
FIG. 2 illustrates a relationship between a viewing user and a matched user according to one embodiment

FIG. 2 illustrates a relationship between a viewing user 200 and a matched user 220 according to one embodiment. The viewing user 200 "likes" a node 230 related to sailing in the social networking data. The viewing user 200 is also connected to a connecting user 210, who is a friend in common with matched user 220. While the viewing user 200 doesn't directly know (isn't connected within the social networking system) matched user 220, matched user 220 is a "friend of a friend" for the viewing user 200. The matched user 220 recently made a status update indicating that the matched user attended a yacht race, which is represented in the social networking system as an event node 240. The event node 240 is further associated with a particular location, in this case a location node 250 for a local business called "Sal's Marina." When the event is created, or when the viewing user requests a matching user, or at another time, the social dating system 100 determines that sailing 230 and yacht race 240 are matching interests and sufficiently related that viewing user 200 and matched user 220 have something in common, even if they do not enjoy exactly the same thing as represented in the social networking system 120. To determine that these are common interests, the social dating system 100 determines that these specific interests are both related to a general interest of "boating."

Figure 3:
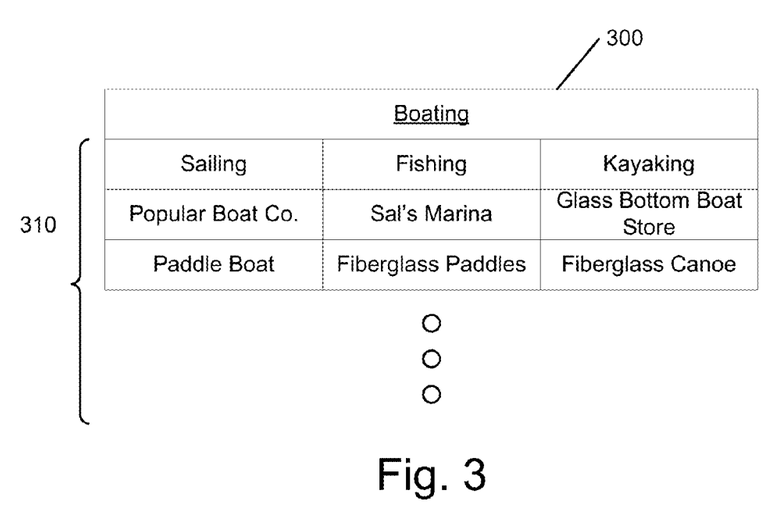
FIG. 3 shows a conceptual example of a general interest according to one embodiment.

FIG. 3 shows a conceptual example of a general interest according to one embodiment. In this example, a general interest 300 is determined when one or more specific interests 310 are associated with a user. In this example, a general interest 300 is "boating." The specific interests 310 that indicate an association with "boating" include activities, such as sailing or fishing; companies, such as a marina; and individual items or products, such as paddles and boats. In this embodiment, the specific interests 310 associated with a general interest 300 are manually curated by an operator of the social dating system 100, to identify social networking objects that reflect an interest in the general interest. This permits use of general interests such as "basketball" to include specific interests such as specific major teams along with college basketball teams, and so forth. Alternatively, or in addition to the manual selection of specific interests, the social dating system may automatically generate specific interests 310 for a general interest 300. This automatic selection may be based, for example, on an analysis of terms associated with groups or clusters of specific interests. As another method, the automatic selection may be based on a co-occurrence of specific interests. The automatic selection may also incorporate some manual oversight, for example assigning a label to an automatically identified cluster of specific interests.

In one embodiment, an affinity score of a user's relationship to an interest is determined to reflect whether a user strongly enjoys the interest or does not interact with the interest frequently. For a specific interest, the affinity score may be based on the number, frequency, and type of interactions of the user with the social networking object associated with the specific interest. For a general interest, the affinity score is based on the specific interests related to the general interest. In one configuration, the affinity score of a general interest for a user may be categorized as high, medium, or low based on the number of different specific interests of the user associated with the general interest. For example, in FIG. 3, a user associated with the specific interest of "sailing" only may have a lower affinity score in the general interest of "boating" relative to a user associated with the specific interests of "fishing" "sal's marina" and "fiberglass canoe." In addition or alternatively, the frequency and number of interactions of the user with a specific interest may also be used by the social dating system to determine the affinity score of a user's interest in the general interest.

Figure 4:
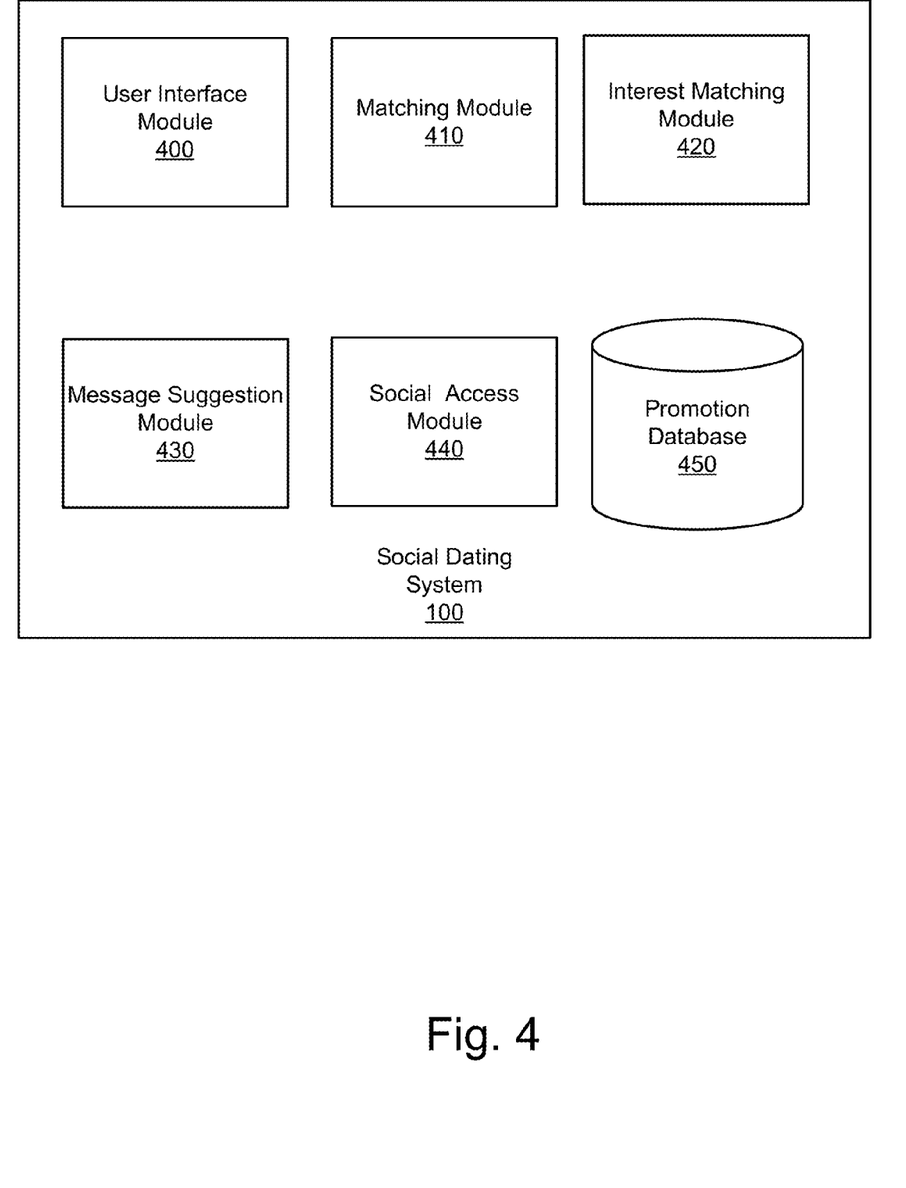
FIG. 4 illustrates components of a social dating system according to one embodiment.

FIG. 4 illustrates components of a social dating system 100 according to one embodiment. In this embodiment, the social dating system 100 includes various modules and databases for processing information and providing social dating services to user devices. The modules in the social dating system 100 includes a user interface module 400, a matching module 410, an interest matching module 420, a message suggestion module 430, and a social access module 440.

The user interface module 400 communicates with user device 110 and organizes data for the user device 110 based on the type of connection the user device 110 has with the social dating system 100. The user interface module 400 is configured to operate various services based on the connection type of the user device 110. For example, the user interface module 400 in one embodiment manages a webpage server to support web page requests, and other services to support applications executing on the user device 110. The user interface module 400 transmits information received from the user device 110 to various other modules of the social dating system 100 and transmits data from these modules to the user device 110. The user interface module 400 may also include formatting and other details to the user device 110 for displaying data to the user of the user device 110.

The social access module 440 accesses the social networking system 120 and manages data received from the social networking system 120. The social access module 440 requests social networking system credentials from the user of the user device 110 and uses the credentials to access social networking data at the social networking system 120. The social access module 440 accesses the social networking system using a protocol, such as an application programming interface (API), typically defined by the social networking system 120. The social access module 440 retrieves social data including social networking objects describing interests of users, interests of users connected to users of the social dating system 100, activity data for the users of the social networking system 120, and so forth. In various embodiments, the social dating system 100 may receive information from the social networking system 120 according to whatever method or storage structure provided by social networking system 120, which may not be in the form of a social graph with social networking objects.

The social access module 440 also manages privacy based on privacy settings of the social networking system 120. When the privacy settings of the social networking system 120 prevent a first user from seeing information about a second user, the first user is not permitted to view that information in the social dating system 100, even if the social dating system 100 may have that information by virtue of the second user supplying access credentials or otherwise enabling the social dating system 100 to access the social networking data on the second user's behalf. In one embodiment, if the social dating system 100 determines that such information may provide an improved match, the social dating system 100 requests permission from the second user if the social dating system 100 may reveal the information, such as through a general interest, to the first user.

The interest matching module 420 determines interests in common between users of the social dating system 100. The interest matching module 420 accesses the social networking system 120 via the social access module 440 to access social networking data relating to two members of the social dating system 100. The interest matching module 420 determines objects in the social graph associated with each user. The objects analyzed by the interest matching module 420 as associated with a user may be broadly defined. For example, a user visiting or "checking-in" to a location, tagging photos of a location, subscribing to activity from an entity, showing the user prefers an entity ("likes" the entity) or otherwise relating to an object in the social graph are considered an association to the entity. Each object (node) in the social graph is labeled with a name, and may also be labeled with tags, such as an object type (e.g., location, business, entity, general interest, etc.) and related concepts or terms. These labels associated with an object may be defined by the social networking system 120, an entity managing the object (e.g., a business may label the business's entity in the social networking system), or by the social dating system 100.

Using the objects associated with two users, the interest matching module 420 determines common interests between the two users. The objects are analyzed to determine the specific interests and any general interests described by the specific interests, as indicated above. The common interests may be an exact match between specific interests or general interests. Since users may not each enjoy a common interest to the same degree, in one configuration a discount factor is calculated to reflect the extent to which the common interest is enjoyed by both users. The discount factor may be based on the affinity score of each user for the common interest. For example, two users who both interact frequently with the same interest (and therefore each has a high affinity score) are not discounted. However, if both users have a low affinity score for the common interest, the matching interest receives a discount to reflect that it may not be a strong predictor of a match between the users.

Using the matching interests of users determined by the interest matching module 420, the matching module 410 identifies users that are suitable matches for one another and prepares data for transmission to the user via the user interface module 400. The matching module 410 may provide matching users to the user as a set or list of matching users, or may provide the matching users based on an activity performed by a matching user. The matching module 410 initially selects a set of preliminary matching users based on selection criteria. Certain selection criteria are set by an operator of the social dating system 100, while other selection criteria are selected by the viewing user. For example, the operator of the social dating system 100 may set a maximum degree of separation of three. Parameters selected by the viewing user may include an age range, gender, gender preference, location, religion, and any other parameters for a match. The viewing user may also select a specific or general interest of the viewing user that the viewing user would like to be matched in a matching user.

Using the selected parameters, matching module 410 selects the set of preliminary matching users using the selection criteria to filter users. Next, the set of preliminary matching users and the viewing user are passed to the interest matching module 420 to determine matching interests between the viewing user and each of the preliminary matching users. The interest matching module 420 returns a set of common interests for each of the preliminary matched users and may also generate a discount factor for each of the common interests as described above. The matching module 410 converts the discount factors associated with each related interest between the viewing user and the preliminary matched users to a compatibility score between the viewing user and each preliminary matched user. In performing the conversion, the matching module 410 in one embodiment excludes common interests that have a discount factor below an interest threshold. In addition, the matching module 410 in one embodiment excludes common interests that are related to interests of the matching user that the viewing user is not permitted to access, for example due to privacy settings of the matching or viewing user. In addition to the common interests, the compatibility score may also incorporate the degree of separation between the viewing user and the preliminary matching user. For example, the compatibility score may be higher when the viewing user and the matching user are at least indirectly connected.

To select a set of matching users, the matching module 410 selects users from the preliminary matched users based on the interest score. The matching module 410 may also rank the users based on the interest score, or the matching module 410 may select, for a set of matching users, any user that exceeds an interest level threshold. In other embodiments, rather than calculating an interest score, the matching module 410 selects the matching users directly from the preliminary matched users based on the set of common interests. When the viewing user has executed a search, the matching module 410 returns the set of matching users to the user device 110 directly. When the search includes an interest as a search term, the matching module 410 removes users that are not associated with the interest selected by the user. The matching module 410 returns users that are associated with the indicated interest.

When a viewing user selects a matching user, a profile page for the matching user is provided to the viewing user. The profile page may include a picture, demographic information about the matching user, common interests between the viewing user and the matching user, and other information as further described below.

In one configuration, the matching module 410 returns an activity feed to the viewing user responsive to a request from the viewing user's user device 110 for an activity feed. The matching module 410, after determining a set of potential matching users, accesses the social networking system to determine recent activity for the potential matching users. A recent activity related to a common interest is selected for presentation to the viewing user and additional matching interests, when available, are selected to accompany the activity and be shown to the user. The set of recent activities and related matching users is transmitted for display to the user of the user device 110. In this way, in addition to viewing the common interest, a user may also view activities of the match related to an interest, which may further personalize the presentation of the matching user's information.

To help initiate conversations between users, a message suggestion module 430 selects and suggests messages to the viewing user to send to the matched user. The message suggestion module 430 determines and selects at least one message for the user related to a common interest displayed to the user. The common interest that the message relates to may be a message relating to an activity in an activity feed, or may relate to any common interest displayed to the viewing user. In one embodiment, when a common interest is not displayed to the user (e.g., because it does not have a high discount factor), no messages are suggested for that common interest. The language for the suggested message may be selected based on the type of interest. For example, when the interest is a sport or event, the message suggestion module 430 prepares a suggested message based on the sport or event. The type of interest may be determined by the social networking object associated with the specific interest, as the social networking object may designate information about itself, such as its type, or the type of interest may be determined by user description of a general interest. The message suggestion module 430 in one configuration also accesses a database of upcoming events to propose a concrete event the viewing user can suggest to the matching user. An event is selected that is related to the common interest of both users. For example, an upcoming game at a local stadium. For other common interests, such as books, authors, concepts, and other interests, the suggested message may relate to the common interest itself.

To populate information in the message, the message suggestion module 430 may insert information about the common interest into the message. Based on the type of common interest, the message suggestion module 430 identifies a message template. For example, for a book type, the message template may be a string indicating "I like <Book title>, too. Who's your favorite character?" The message template may be selected from a group of message templates relating to a particular message type.

In another embodiment, the message suggestion module 430 accesses promotions 450 to select a sponsored suggestion for the viewing user. Promotion database 450 is a database storing promotions by advertisers placed by advertising system 130. The promotions stored in promotion database 450 include a description of the promotion and targeting criteria describing interests related to the promotion and the types of users that may be provided with the promotion. The message suggestion module 430 may also select a promotion for a suggested message to a user. The promotion is selected based on targeting criteria for the promotion, which may specify demographic and other information of users to be presented the promotion.

A suggested message may also be a response to a date request by a user. Promotions may also be associated with a date request by a user. The date requests may be managed by message suggestion module 430. A user may select and publish a date request. For example, the date request may request another user do something related to a common interest with the user, or the date request may specify a location or other aspect of a date. Using an interest of the user, the social dating system 100 may also suggest an interest for a date request. Alternatively, an interest may be determined from the terms in a date request. The interest may be determined based on a dictionary of terms. For example, a date request such as "Anyone want to see a new movie?" is analyzed to relate to "movies" as an interest. At least one interest associated with the date request is used to select a promotion from the promotion database 450 and present the promotion along with the date request to viewing users that see the date request. For example, when a viewing user is presented with this date request, a promotion relating to discounted movie tickets may be selected and presented alongside the date request.

Figure 5:
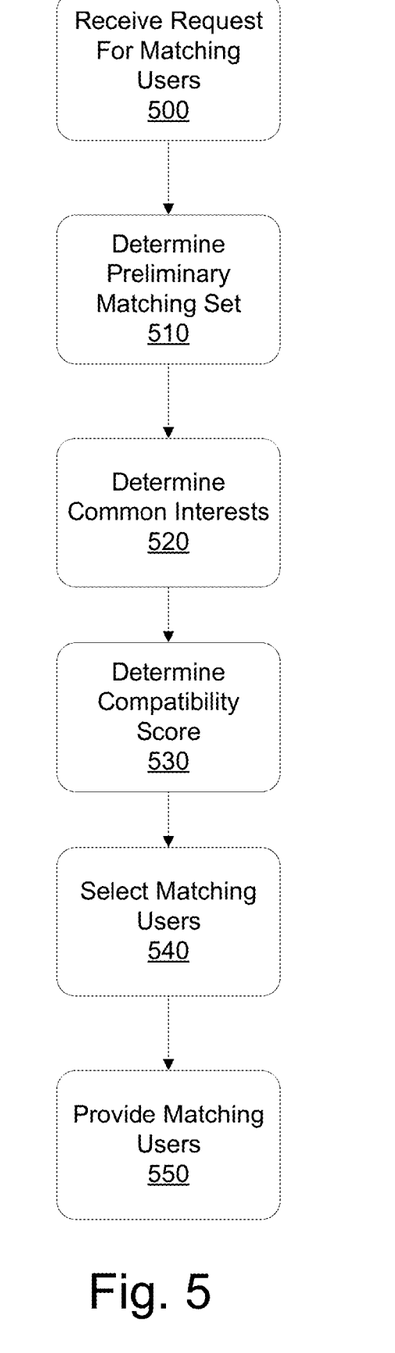
FIG. 5 is a flowchart of a method for suggesting matching users according to one embodiment.

FIG. 5 is a flowchart of a method for suggesting matching users according to one embodiment. This method is performed in one embodiment by modules and components of the social dating system 100. The social dating system initially receives 500 a request for matching users from a user device 110. The request for matching users is received from a user device operated by a viewing user. The social dating system initially determines 510 a set of preliminary matching users, based on search criteria, such as demographic and geographic information, an interest, a maximum degree of separation, or other criteria that may be entered by a viewing user. In one embodiment, the matching users are selected responsive to a search that designates an interest, in which case the preliminary matching set includes only users with that interest in common with the viewing user. Next, common interests are determined 520 for the preliminary matching users, and an associated discount factor is determined for the common interests between the matching user and each user in the preliminary matching set, as described above with respect to the interest matching module 420. Next, using the common interests of the preliminary matching users, a compatibility score is determined 530 between each of the preliminary matching users and the viewing user, which may incorporate the common interests and degree of separation between the preliminary matching user and the viewing user. Using the compatibility scores, a set of matching users is selected 540 as described above with respect to the matching module 410. The selected users are provided to the viewing user for display on the user device. In one configuration, recent activity of the matching users is accessed and the recent activity is matched to a common interest. For recent activity by matching users that relates to a common interest, the recent activity is selected 540 for inclusion in an activity feed. The activity feed is transmitted to the user device 110 for presentation to the user.

Figure 6:
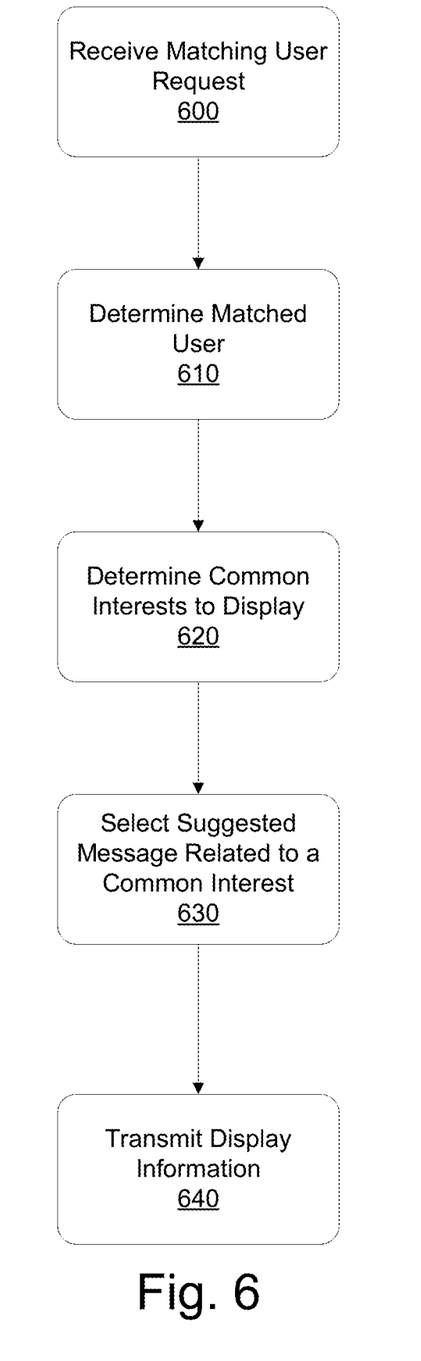
FIG. 6 is a flowchart of a method for selecting suggested messages related to a matched user according to one embodiment.

FIG. 6 is a flowchart of a method for selecting suggested messages related to a matched user according to one embodiment. This method is performed in one embodiment by modules and components of the social dating system 100. The social dating system 100 first receives a request 600 to show a matching user to a viewing user. This request is a request to view a profile, a request to perform a search for matching users, or another request resulting in a selection of matching users or information about matching users. Next, the social dating system 100 determines 610 a matched user, or several matched users, responsive to the request. The matched users may be selected by any method, and in particular may be selected based on a common interest as described above. The social dating system 100 determines 620 the common interests to be displayed to the viewing user relating to the matched user. Based on the common interests, the social dating system 100 selects 630 a suggested message to accompany the common interest in the display and transmits 640 the suggested message and other display information to the user device 110 for presentation to the viewing user. The suggested message in various configurations may be selected based on a common interest associated with a date request by the matched user, or may be selected from promotions provided by advertisers. In addition, rather than initially selecting the common interests, the selection of which common interests to display to the user may be based on available promotions. For example, a matched user may have many common interests with the viewing user, but only some of the common interests are eligible for promotions (e.g., are associated with terms related to a promotion). In this case, the common interests selected for the user may be based on an associated promotion.

Figure 7:
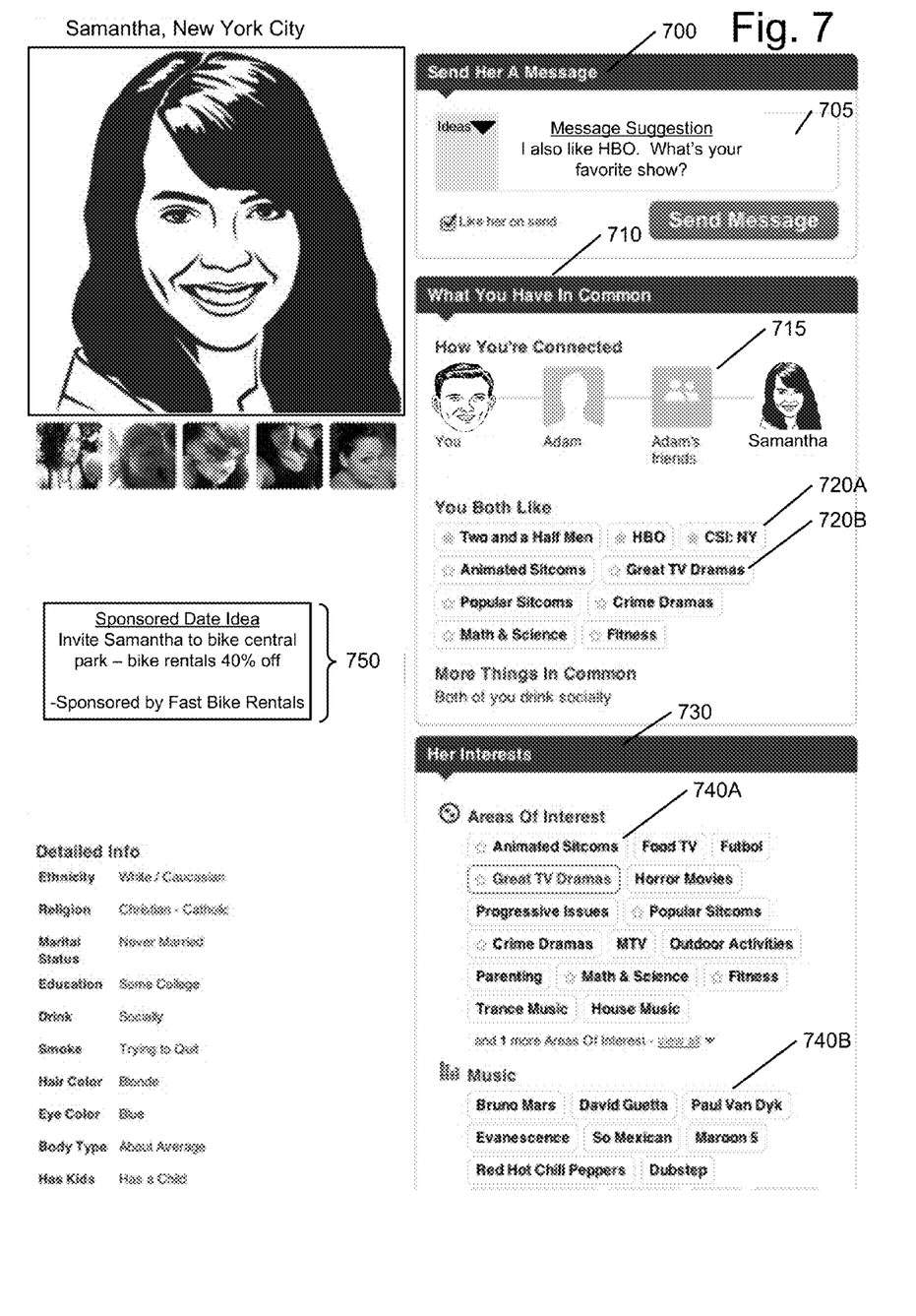
FIG. 7 is a user interface for displaying a user profile including common interests for a match according to one embodiment.

FIG. 7 is a user interface for displaying a user profile including common interests for a match according to one embodiment. The user interface is presented to the viewing user on the user device 110. In the embodiment shown in FIG. 7, a viewing user is shown common interests determined from a match's interactions with social networking objects in a social network. Though only one user is shown here, multiple users and related interests may be shown in one embodiment. The user interface shows various elements of a user profile, including a picture and detailed demographic information, such as ethnicity, religion, education, and so forth.

The user interface includes an interface to send a message 700 to the matched user. In the message interface, suggested messages generated by message suggestion module 430 may be displayed to the viewing user. The viewing user may also select a drop-down menu to select message suggestions based on additional common interests. The viewing user may edit the suggested message before sending the message to the matched user.

Another interface displays things in common 710 between the viewing user and the matched user. The things in common 710 include an indication of the degrees of separation, and in particular an interface element 715 showing a connection path between the viewing user and the matched user. In this example, the viewing user is connected to the matched user through two other users, making the matched user a degree of separation of three from the viewing user. The things in common 710 also include a display of common interests 720. The common interests include specific interests 720A and general interests 720B between the users. In this example, specific interests 720A that are in common are designated by a star, while common interests 720 are designated by a star outline. In this way, a viewing user can quickly determine common interests with the matched user. In this example, specific interests 720A include "Two and a Half Men", "HBO", and "CSI: NY." The general interests 720B include "Animated Sitcoms" "Crime Dramas" and "Fitness" among others. Using the general interests 720B, though the viewing user and the matched user don't appear to match on specific fitness activities, the specific interests relating to fitness are used to determine a general interest 720B based on fitness and permit the users to identify commonalities easily.

In addition to the things in common 710, the profile may also include the matched user's interests 740. The matched user's interests 740 may display any interests of the matched user, or may exclude the interests that have already been displayed as a common interest 720. These displayed interests include general interests 740A. The interests may also include specific interests in categories, such as music interests 740B.

In addition to the message suggestion 705, a sponsored date idea 750 may also be presented to the user. In this embodiment, the sponsored date idea 750 integrates a promotion by an advertiser into a date idea related to common interests between the viewing user and the matched user. This presents the viewing user with a promotion related to the interests shared with a potential match for the viewing user, and allows the advertiser's promotion to be displayed to users who may be actively looking for activities for a date. In particular, promotions that include a coupon or other deal may be particularly relevant to the viewing user, as the viewing user may be able to suggest a reduced-price date to the match. The viewing user may be interested in a promotion to reduce the cost for a date, while the advertiser is able to promote specific products or services. In this example, the common interest of "fitness" and the matched user's location in New York City matches a sponsored date idea for biking in Central Park. Thus, the promotion may be provided to the user in several ways: as a date idea ("you both like biking, enjoy 30% off a bike rental"), as a suggested message for the viewing user to send to the matched user ("I see you also like biking There's a 30% discount this weekend."), or both.

In various embodiments, in addition to or instead of sending the suggested messages to a viewing user, the social dating system 100 also generates and sends other promotions based on the identified common interests. The promotions may be presented to the viewing user alongside related suggested messages. The promotion may be sent to the viewing user only or may also be shown to a matched user when a message is sent. For example, the promotion for a coupon or other deal for biking may be shown to the user sending the suggested message, and may also be included in the message sent to the matched user. In some embodiments, the user may select whether the advertisement is also sent to the matched user. The viewing user may not want the matched user to know that the viewing user will take advantage of the promotion, for example that the viewing user is using discounted tickets for a date suggestion. Thus, when the server identifies that two users have a common interest, the server may suggest a promotion to both users, or may suggest the promotion to only one user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selecting matches in a social dating system, the method comprising:
 receiving a request from a user device associated with a viewing user to view matching users;
 identifying at least one preliminary matching user connected to the viewing user via at least one connecting user in a social networking system;
 determining a common interest representing a general interest in common between the viewing user and each of the preliminary matching users based on interactions of the viewing user with a first social networking object for a first specific interest and interactions by the preliminary matching users with a second social networking object for a second specific interest, where the first and second social networking objects are different;
 selecting matching users based on the Get of common interest associated with the preliminary matching users; and
 providing the matching users for display to the viewing user.

2. The method of claim 1, wherein the request to view matching users includes viewing user preferences, and the preliminary matching users are selected based on the viewing user preferences.

3. The method of claim 1, wherein the common interest is associated with a discount factor indicating the relatedness of a viewing user interest to a matched user interest.

4. The method of claim 3, wherein selecting the matching users based on the common interest excludes common interests that are associated with a discount factor below a threshold of relatedness.

5. The method of claim 3, wherein selecting the matching users is based on the discount factor.

6. The method of claim 1 further comprising:
 selecting a set of recent activities associated with the matching users, each recent activity associated with a matching user and a common interest of the viewing user and the matching user; and
 providing the set of recent activities for display to the user.

7. A method for suggesting messages in a social dating system, comprising:
 receiving a request from a user device associated with a viewing user to view a matching user;

identifying a common interest representing a general interest in common between the viewing user and the matching user based on interactions of the viewing user with a first social networking object for a first specific interest and interactions by the matching user with a second social networking object for a second specific interest, where the first and second social networking objects are different;

selecting a promotional offer for the viewing user for an activity to do with the matching user related to the identified common interest; and transmitting the promotional offer to the user device for display.

8. The method of claim 7, wherein the matching user is connected to the viewing user via at least one connecting user in a social networking system.

9. The method of claim 7, wherein the promotional offer is a suggested message to be sent to the matching user.

10. The method of claim 9, wherein the suggested message is a date suggestion provided for the matching user.

11. The method of claim 7, wherein the promotional offer is sent to another user device associated with the matching user.

12. The method of claim 7, wherein at least one common interest is determined from a first social networking system object associated with the viewing user and a second social networking object associated with the matching user.

13. A non-transitory computer-readable medium for selecting matches in a social dating system, the medium including instructions that when executed by a processor cause the processor to:

receive a request from a user device associated with a viewing user to view matching users;

identify at least one preliminary matching user connected to the viewing user via at least one connecting user in a social networking system;

determine a common interest representing a general interest in common between the viewing user and each of the preliminary matching users based on interactions of the viewing user with a first social networking object for a first specific interest and interactions by the preliminary matching users with a second social networking object for a second specific interest, where the first and second social networking objects are different;

select matching users based on the set of common interests associated with the preliminary matching users; and provide the matching users for display to the viewing user.

14. The non-transitory computer-readable medium of claim 13, wherein the request to view matching users includes viewing user preferences, and the preliminary matching users are selected based on the viewing user preferences.

15. The non-transitory computer-readable medium of claim 13, wherein each common interest in the set of common interests is associated with a discount factor indicating the relatedness of a viewing user interest to a matched user interest.

16. The non-transitory computer-readable medium of claim 15, wherein selecting the matching users based on the set of common interests excludes common interests that are associated with a discount factor below a threshold of relatedness.

17. The non-transitory computer-readable medium of claim 15, wherein selecting the matching users is based on the discount factor.

18. The non-transitory computer-readable medium of claim 13, the instructions further causing the processor to:

select a set of recent activities associated with the matching users, each recent activity associated with a matching user and a common interest of the viewing user and the matching user; and provide the set of recent activities for display to the user.

* * * * *

UNITED STATES PATENT AND TRADEMARK OFFICE
CERTIFICATE OF CORRECTION

PATENT NO. : 10,025,835 B2
APPLICATION NO. : 14/639981
DATED : July 17, 2018
INVENTOR(S) : Clifford Lerner Page 1 of 1

It is certified that error appears in the above-identified patent and that said Letters Patent is hereby corrected as shown below:

In the Claims

Column 12, Claim 1, Line 39, after "based on the", delete "get of"

Signed and Sealed this
Seventh Day of May, 2019

Andrei Iancu
*Director of the United States Patent and Trademark Office*